US005128212A

United States Patent [19]

Kneale et al.

[11] Patent Number: 5,128,212

[45] Date of Patent: Jul. 7, 1992

[54] MULTILAYER HEAT SHRINKABLE POLYMERIC FILM CONTAINING RECYCLE POLYMER

[75] Inventors: Timothy M. Kneale; Richard K. Roberts; John D. Snyder, all of Clinton, Iowa

[73] Assignee: E. I. Du Pont de Nemours and Company, Wilmington, Del.

[21] Appl. No.: 692,147

[22] Filed: May 2, 1991

Related U.S. Application Data

[63] Continuation-in-part of Ser. No. 525,020, May 18, 1990.

[51] Int. Cl.[5] .......... B32B 2/08

[52] U.S. Cl. .......... 428/516; 428/903.3; 156/244.11

[58] Field of Search .......... 428/903.3, 516; 156/244.11

[56] References Cited

U.S. PATENT DOCUMENTS

| | | | |
|---|---|---|---|
| 4,439,478 | 3/1984 | Ferguson | 428/137 |
| 4,532,189 | 7/1989 | Mueller | 428/516 |
| 4,837,084 | 6/1989 | Warren | 428/349 |
| 4,877,682 | 10/1989 | Sauers | 428/903.3 |
| 4,923,750 | 5/1990 | Jones | 428/903.3 |

*Primary Examiner*—Edith L. Buffalow

[57] ABSTRACT

The use of multilayer heat shrinkable film for advantageous high shrinkage but low shrinkage force is combined with the use of recycle scrap of such film to provide multilayer heat shrinkable film retaining these advantageous properties. Exemplary of the film is a core of a blend of certain linear low density polyethylene with certain highly branched low density polyethylene sandwiched between two relatively thin outer layers of propylene/ethylene copolymer, with the core also containing recycle scrap of the multilayer film.

24 Claims, No Drawings

MULTILAYER HEAT SHRINKABLE POLYMERIC FILM CONTAINING RECYCLE POLYMER

BACKGROUND OF THE INVENTION

This application is a continuation-in-part application Ser. No. 07/525,020 filed May 18, 1990 by the same inventors.

1. Field of the Invention

This invention relates to the use of recycle multilayer heat shrinkable polymeric film along with virgin polymer to form multilayer heat shrinkable film having attractive shrinkage force.

2. Description of Related Art

U.S. Pat. No. 4,532,189 discloses a heat shrinkable film of a core layer sandwiched between coextruded skin layers. The core layer is disclosed to consist of at least 10% of LLDPE or LMDPE blended with 0 to 90% of ethylene/propylene copolymer or with other ethylene copolymers or LDPE in varying amounts. LLDPE is disclosed to mean linear low density polyethylene, which is further disclosed to mean a copolymer of ethylene and 8% or less of butene, octene, or hexene, and having a density of from 0.910 to 0.925 g/cc$^3$. Ethylene propylene copolymer is disclosed to mean such copolymer wherein propylene is present as a major constituent and ethylene is present as a minor constituent. LDPE is disclosed to be a homopolymer of ethylene. The skin layers are disclosed to be ethylene propylene copolymer or blends of ethylene propylene copolymer with other specific polymers, e.g. polypropylene, with the preferred skin layers having a composition of 80% ethylene propylene copolymer and 20% polypropylene. The preferred core layer is disclosed to consist essentially of LLDPE. The patent also discloses five-layer heat shrinkable film in which intermediate layers are present between the core layer and skin layers.

U.S. Pat. No. 4,837,084 discloses heat shrinkable film suitable for bags and pouches. The film is disclosed to comprise at least one layer of a copolymer of ethylene and an alpha-olefin with 6 or more carbon atoms per molecule and having a density of about 0.910 g/cc or less and melt index of about 2 or less. The patent discloses that these copolymers belong to the class of polymers known as very low density linear polyethylene (VLDPE). In Table I, ethylene copolymers (with octene) having densities of 0.911 and 0.912 g/cc are disclosed to be a comparison example and to come from a different class, namely the class called LLDPE. The patent also discloses that the VLDPE can be blended with up to 50% by weight with ethylene acrylate copolymer, LLDPE, HDPE, LMDPE, LHDPE, LDPE, MDPE, EVA, acid modified EVA, PP, ethylene/propylene copolymers, copolymers of certain alpha-olefins with certain carboxylic acids. For one embodiment, the patent discloses positioning the VLDPE layer between a heat sealing layer and an outside layer and that the heat sealing layer can consist of the other polymers that can be used in the VLDPE layer as well as many more polymers disclosed. The Examples in the patent, however, disclose the sealing layer to be primarily coextruded EVA copolymer, wherein the coextruded inner layer and heat sealing layer are subjected to irradiation. Barrier and outside layers are then extruded onto the radiation crosslinked coextrudate. Radiation involved in making this four-layer heat shrinkable film prevents scrap from the film from being recycled by melt processing, e.g. extrusion.

U.S. Pat. No. 4,439,478 discloses a heat shrinkable film of a base layer of propylene homopolymer and at least one skin layer of a blend of propylene-ethylene copolymer with 20 to 40% by weight of propylene homopolymer, the base layer being at least 4 times the thickness of the skin layer.

Cryovac MPD-2055 heat shrinkable film is available from W. R. Grace and Company. This film is understood to consist of a core layer of LLDPE sandwiched between two outer layers of propylene ethylene copolymer in which the ethylene constitutes about 3% of the weight of the copolymer. The two outer layers constitute 50% of the weight of the film, and the film does not appear to have been irradiated.

The need exists for heat shrinkable film having high shrinkability upon application of heat, typically 110° C., and low shrinkage force and which can use scrap multilayer heat shrinkable film for recycling by melt processing along with virgin thermoplastic polymer into heat shrinkage film.

SUMMARY OF THE INVENTION

The present invention satisfies the aforesaid need by providing multilayer heat shrinkable film which contains recycle thermoplastic polymer from scrap of multilayer heat shrinkable film.

One embodiment of the present invention can be described in the context of the process of coextruding multilayer film having at least a core comprising thermoplastic polymer sandwiched between two outer layers comprised of thermoplastic polymer different from the thermoplastic polymer of said core and converting said film to heat shrinkable film, the improvement comprising proportioning the coextruded amount of each of the thermoplastic polymers so that said two outer layers each constitute about 8 to 20% of the weight of said film, selecting the composition of said different thermoplastic polymer so as to have greater stiffness than the stiffness of said thermoplastic polymer of said core, so as to provide greater stiffness to said heat shrinkable film, and co-extruding recycle of said film into said core along with said thermoplastic polymer of said core, said recycle of said film constituting from about 10 to 45% based on the weight of said film, the remainder of said core being said thermoplastic polymer which is virgin polymer of said core and obtaining as a result thereof film which has excellent heat shrinkage properties. Thus, both recycle polymer and virgin polymer are present in the core.

In addition to the thermoplastic polymers of the outer layers having greater stiffness than the thermoplastic polymer of the core, the thermoplastic polymer of the outer layers will also typically have lower shrinkage and higher shrinkage force as compared to the thermoplastic polymer of the core. Nevertheless, incorporation of the thermoplastic polymer of the outer layers into the core via recycle of scrap film into the core does not appreciably impair the higher heat shrinkability with lower shrinkage force of the virgin polymer in the core to provide these attributes to the overall heat shrinkable film.

In one embodiment, the core is a single layer and all the recycle film is present in this single layer coextruded as a pre-blend with the virgin polymer forming the core. In another embodiment, the core is a plurality of layers comprising an interior or core layer containing the virgin polymer of the core and at least one tie layer. Preferably, there are two separate or tie layers between which the core layer is sandwiched. In this embodiment, the recycle film can be entirely present in the tie layer(s), or in the core layer, or can be distributed between the tie layer(s) and the core layer, still providing about 10 to 45% of the weight of the film.

Exemplary of multilayer heat shrinkable film made by the process of the present invention is such film comprising a core sandwiched between two outer layers, each said two outer layers constituting about 8 to 20% of the weight of said film, said core comprising virgin thermoplastic polymer and about 10 to 45% based on the weight of said film of recycle of said film, said virgin polymer being a blend comprising (i) about 50 to 90% based on the weight of said virgin polymer of linear polyethylene having a density of about 0.890 to 0.915 g/cc and being a copolymer of ethylene with about 10 to 16% based on the weight of said copolymer of alpha-monoolefin having at least 4 carbon atoms with (ii) about 10 to 50% based on the weight of said virgin polymer of highly branched polyethylene having a density of about 0.917 to 0.928 g/cc, each said outer layers comprising propylene/ethylene copolymer containing from about 2 to 6% of ethylene based on the weight of said propylene/ethylene copolymer and blended therewith from 0 to about 20% of polypropylene based on the weight of said outer layers.

DESCRIPTION OF PREFERRED EMBODIMENTS

The present invention involves the use of conventional processing for making multilayer coextruded heat shrinkable film such as described in U.S. Pat. No. 4,837,084, except that in accordance with the present invention, recycle scrap multilayer heat shrinkable film is a component of the core of the heat shrinkable film of the present invention. In addition, the coextruded heat shrinkable film of the present invention is preferably a balanced (symmetrical) film in that the core is sandwiched between two outer layers of the same thickness and composition (different from core layer), which layers together account for no more than about 40% of the weight of the film. When the core comprises a core layer sandwiched between at least two separate or tie layers, the core is also preferably balanced. The balanced film tends not to curl in subsequent use. The uniqueness of the particular composition of the heat shrinkable film of the present invention will be described hereinafter.

The basic process steps of the preferred conventional process for making multilayer coextruded heat shrinkable film, as applicable to the present invention, involve coextruding film in the form of a tube of thermoplastic polymer forming a core sandwiched between two outer layers. When the core is comprised of a plurality of layers instead of a single layer, these layers are coextruded with the tie layers as well. This coextruded film in the form of a tube is converted to heat shrinkable film by biaxially orienting the coextruded tube and cooling the resultant film and winding it up onto a roll(s) for shipment and handling. The orientation is preferably carried out by the "trapped bubble" technique wherein the film tube is cooled and then reheated to its orientation temperature, followed by introducing air into the interior of the tube to blow it into a bubble, causing transverse orientation of the film. The orientation temperature of the film is the temperature at or below the melting point of the film, to which the film can be heated and stretched to cause molecular alignment within thermoplastic polymer comprising the film and upon cooling of the film in the stretched condition, the film exhibits shrinkability when reheated. Downstream of the bubble, the bubble is collapsed between a pair of nip rolls operating at a faster surface speed than the rate of coextrusion, thereby causing machine direction or longitudinal orientation of the film during the transverse orientation thereof. The resultant biaxially oriented film having been stretched at least about 3X in the transverse and machine directions and cooled in the stretched condition has memory which is recalled when the film is reheated after being draped around an article to be packaged by the film. With such heating, the film shrinks to snugly envelop the article.

The weight relationship between the layers of coextruded tube and the resultant heat shrinkable film is the same, i.e., the orientation uniformly stretches all the layers of the multilayer film. Preferably, the two outer layers each constitute about 12 to 18% of the weight of the film.

In accordance with the present invention, the conventional film process just described is modified to include scrap multilayer heat shrinkable film in the coextrusion process along with virgin thermoplastic polymer to produce the core of the film. Considerable scrap is generated in the course of manufacture of coextruded multilayer heat shrinkable film, such scrap coming from such sources as the trimmings from roll ends, film breakages in the film manufacturing process, and film waste resulting from filling custom orders involving less than the full width of rolls of the film. In the case of monolayer heat shrinkable film, it is safe to recycle scrap with virgin polymer because the composition of the scrap and the virgin polymer is the same. In the case of multilayer film of layers having different composition, as in the present invention, the scrap has a different composition from any individual layer of the film.

It has been found that recycle scrap of multilayer film can be incorporated into the core of multilayer film of the present invention without being appreciably deleterious to either the manufacture of the film or its heat shrinkage properties.

Since this recycling involves re-melting the scrap and blending its combined layers with one another and possibly with the virgin polymer to form the core, the scrap must be melt processible. This means that the original heat shrinkable film from which the scrap was obtained must be free of crosslinking, such as from radiation, which would prevent melt processing.

When the core is a single layer, the entire core is a blend of virgin polymer and recycle scrap. When the core comprises a plurality of layers, the blend is preferably present in the core layer sandwiched between at least two tie layers. In that embodiment, the recycle scrap can be present in either the tie layer(s) or the core layer or both and the coextrusion operation would be carried out accordingly. In any event, the desired proportion of 10 to 45% of recycle film based on the weight of the multilayer film will still be observed.

The composition of the scrap multilayer film recycled into the core of the film of the present invention is the same as the composition of the coextruded multilayer film of the present invention. This is achieved by the build-up of propylene/ethylene copolymer (and optionally, polypropylene) from the recycle scrap in the core until equilibrium is reached after operation has begun based entirely on virgin polymer. Preferably, the proportion of scrap multilayer film incorporated into the core is about 25 to 40% based on the weight of the film which embodies the core.

Various methods are available for incorporating the scrap film into the coextruded core of the heat shrinkable film. Most conveniently, the scrap can be chopped up into flakes having as their greatest dimension no greater than about 4 mm. The flakes can be pre-blended with molding granules of virgin polymer to form the coextruded core and then added to the extruder or the pre-blending can be carried out by simultaneously adding the desired proportions of scrap and virgin polymer to the extruder which extrudes the core. It has been found that despite the different shape of the recycle polymer (film) and the virgin polymer feeds to the extruder, and despite the fact that the recycle polymer is formed from multilayer film of different overall composition from the core layer, the coextruded blend portion of the core is provided as a homogeneous blend of recycle polymer and virgin polymer. Tie layer(s) of recycle film can be formed by dedicating one or more extruders to melt process the recycle film and coextrude the tie layer(s) along with the coextrusion of the rest of the multilayer film.

The virgin thermoplastic polymer content of the core is composed of a blend preferably comprising 70 to 80% of the linear low density polyethylene described and 20 to 30% of the highly branched low density polyethylene described. These percentages are by weight and refer to the total amount of these two components provided as virgin polymer.

Preferably, the linear low density polyethylene is polyethylene that has become available as ultra low density linear polyethylene manufactured by polymerization at low pressure and having a preferred density of 0.911 to 0.914 or 0.915 g/cc and melt index of about 0.5 to 2 g/10 min. and preferably about 1 g/10 min. and preferably a Vicat softening point of at least about 85° C. Whether called "linear low density" or "ultra low density" polyethylene, it should be understood that the density is established by the densities disclosed herein. Within the preferred density range for this polymer, the best combination of high shrinkage and low shrink force is obtained for the film. In addition, this polymer is generally made by polymerization at a low to medium pressure (about 29 to 30 MPa) in the presence of a coordination catalyst such as organo-aluminum, titanium, or vanadium compounds. Titanium-modified organo-aluminum catalysts are also used. Although called "polyethylene", this polymer is in fact a copolymer of ethylene with about 10 to 16% of alpha-monoolefin having at least 4 carbon atoms based on the weight of the copolymer. Examples of alpha-monoolefins include 1-butene, 1-hexene, 1-octene, and 1-decene, with generally not more than 18 carbon atoms being present in the alpha-monoolefin. The alpha-monoolefin 1-octene is preferred. This copolymer provides high shrinkage, low shrink force and toughness to the eventual heat shrinkable film.

The density of the highly branched low density polyethylene will generally be about 0.917 to 0.928 g/cc and more often about 0.917 to 0.925 g/cc. Preferably, the highly branched low density polyethylene has a density of 0.920 to 0.924 g/cc, more preferably about 0.923 g/cc, and melt index of 1 to 3 g/10 min. The polyethylene is highly branched resulting from its manufacture by polymerization at high pressure in a tubular reactor. In the tubular reactor, ethylene containing free-radical initiator is passed through a preheater where it is heated to 100 to 200° C., followed by passage through a tube where it is heated to 250°-300° C. as polymerization occurs under high pressure. Tubular polymerization reactions are described, for example, in U.S. Pat. Nos. 2,870,130 and 2,839,515.

The different polymerization conditions used to make the linear low density polyethylene and the highly branched low density polyethylene produce polymers having distinctly different weight average molecular weight ($M_w$):number average molecular weight ($M_n$) ratios. For the linear low density polyethylene, $M_w/M_n$ is preferably less than about 6, while for the highly branched polyethylene, $M_w/M_n$ is preferably greater than about 10, which means that the highly branched polyethylene is composed of a relatively broad distribution of molecular weight fractions.

The resultant highly branched low density polyethylene has a much broader molecular weight distribution then low density polyethylene (LDPE) made by polymerization under high pressure in an autoclave. The $M_w/M_n$ of this conventional autoclave LDPE of density and melt index comparable to that of the highly branched low density polyethylene used in the present invention is usually less than about 5.

In the core, the highly branched low density polyethylene provides even higher shrinkage to the core than if the core consisted entirely of linear low density polyethylene as the virgin polymer in the core. It is also believed that the highly branched low density polyethylene is more effective than LDPE in this regard.

The blend of the linear low density polyethylene and highly branched low density polyethylene in the core of film of the present invention has the following physical characteristics: provides high shrinkage together with low shrink force to the core and thus to the multilayer film of the present invention, and these properties are not appreciably affected by the presence of recycled scrap in the core.

The two outer layers between which the core is sandwiched are preferably composed of propylene/ethylene copolymer preferably containing from 2 to 5% of ethylene, and more preferably 3 to either 4 or 5%, based on the weight of the copolymer and having a melt flow index of about 1.5 to 10 g/10 min. These layers provide stiffness to the heat shrinkable film of the present invention and as such will typically form the outer surfaces, i.e., outer layers, of the film. Thus, the polymer making up the outer layers will generally have a stiffness as measured by flex modulus of at least 2X and more often at least 3X of the stiffness of the blend of virgin polymer in the core.

The outer layers have lower heat shrinkability and higher shrinkage force than the core under the conditions of manufacture. These outer layers also typically have a higher melting temperature characterized by a higher orientation temperature, preferably at least about 10° C. greater than the orientation temperature of the core layer. When the copolymer forms each outer layer of the film, i.e., there are no additional layers covering the exposed surface of the outer layers, each outer layer preferably contains slip and antiblock agents, which can be conventional, so as to facilitate the handling of the film. Slip agent may also be added to the core so that slip agent migration will occur towards the film surface to provide slip properties rather than towards the core.

Stiffness of the outer layers can be increased by addition of up to 20% of polypropylene based on the weight of the layers to these layers. Such polypropylene preferably has a melt flow index of 1.5 to 10 g/10 min. The propylene/ethylene copolymer and polypropylene may be preblended for feeding to the extruders coextruding these layers with extrusion of the core or these polymers in granule form may be blended in the extruders themselves. Preferably, the polypropylene content of the additional layers does not exceed about 15% based on the weight of these layers.

Coextrusion of the multilayer film of virgin thermoplastic polymers described hereinbefore produces a certain amount of scrap. In accordance with the present invention, the desired proportion of this scrap is recycled by blending with the virgin thermoplastic polymer materials as described hereinbefore to form either the core of the heat shrinkable film of the present invention or a core layer within the core, the remainder of the core comprising tie layers between which the core layer is preferably sandwiched. The recycle film can also be present in or constitute the tie layer(s) and can be exclusively present in the tie layer(s). The presence of the recycle film in the core results in the introduction of the lower shrinkage, stiffer polymeric materials from the additional layers of the film scrap into the core. Nevertheless, the resultant film has heat shrinkage which compares favorably with the multilayer film made entirely of virgin resins.

Not only does the film of the present invention exhibit favorable shrinkage despite the presence of stiff relatively low shrinkage polymer scrap in its core, the film also exhibits very favorable low shrinkage force, typically less than about 2100 kPa (at 110° C.). The film exhibits high shrinkage, typically at least 20% in each of the machine and transverse directions at 110° C., to retract towards its original dimension upon heating to snugly envelop the article being packaged by the film. As the film engages the article during this shrinkage, the film does not exert excessive shrink force which would tend to crush or distort the article.

Typically, heat shrinkable film of the present invention will have an overall thickness of about 12 to 50 microns.

The amount of propylene/ethylene copolymer in the core will depend on the proportion of scrap recycled to make the core and the relative weight of the outer layers relative to total film weight in the film from which the scrap is obtained. The following Table gives the amount of propylene/ethylene copolymer in the core, on the basis of the outer layers in the film scrap being entirely of the propylene/ethylene copolymer (P/E) described earlier herein.

TABLE I

| Wt. % of sum of P/E Outer Layers in film scrap | Scrap Recycled in Core Wt. % Based on Total Weight of Film: 30 | | 35 | | 40 | |
|---|---|---|---|---|---|---|
| | Wt % P/E | Wt % Scrap | Wt % P/E | Wt % Scrap | Wt % P/E | Wt % Scrap |
| 20 | 10.2 | 36.3 | 13.5 | 43.8 | 16.7 | 50 |
| 25 | 13.6 | 38.7 | 17.9 | 46.7 | 22.2 | 53.5 |
| 30 | 17.5 | 41.4 | 23.1 | 50 | 28.6 | 57.1 |
| 35 | 22.0 | 44.6 | 29.0 | 53.8 | 35.9 | 61.5 |
| 40 | 27.2 | 48.3 | 35.9 | 58.3 | 44.4 | 66.7 |

In this Table, the wt. % P/E and wt. % scrap under the columns headed "30", "35", and "40" are based on the weight of the core unless otherwise indicated.

From Table I, it can be seen that the core will contain at least about 10% of the propylene/ethylene copolymer and up to about 45% thereof and at least about 35% of recycle polymeric material (film) and up to about 70% thereof, all based on the weight of the core. This recycle film can be in the tie layer(s) if present or in the core layer blended with virgin polymer or can be divided up between these layers. It can also be seen that the proportion of P/E in the entire film will range from about 28 to 70 wt. % [sample calculation: 20% +(10.2% X 80%)].

Coextrusion of the core sandwiched between the two outer layers will normally produce sufficient adhesion of the core layer directly bonded to the two outer layers to withstand further processing to make heat shrinkable film and use it as such without delamination between layers occurring. Tie layers between and directly bonded to each outer layer and its respective surface of the core layer can be used, however, if desired. In a preferred embodiment, the tie layers can be composed of recycle of the same scrap used in the core layer. This tends to improve properties of the film, e.g., increased stiffness of the film without appreciably harming the heat shrinkage properties of the multilayer film. Preferably, however, when the core consists of a core layer sandwiched between tie layers, at least 10% and preferably at least 25% of the total weight of recycle film in the film is in the core layer, the remainder forming the tie layers of the core. Alternatively, all of the recycle scrap film may be present in the tie layers which surround the core layer which is entirely of virgin polymer.

Other layers may be coextruded with or subsequently laminated to the multilayer film of the present invention, as will be recognized by one skilled in the art for the purpose of modifying surface properties or barrier properties of the film. It will also be recognized that barrier layer(s) can be incorporated into the core of the film along with tie layers when necessary for insuring an adherent unitary film.

Examples of the present invention are presented hereinafter (parts and percents are by weight unless otherwise indicated).

EXAMPLES 1-3

The low density linear polyethylene used in the core layer of the film of these Examples was ultra low density linear polyethylene having a density of 0.912 g/cc and melt index of 1 g/10 min., and an octene comonomer content of 13% based on the weight of the copolymer. The $M_w/M_n$ of this polymer was 4 to 5.

The highly branched low density polyethylene blended with the low density linear polyethylene to form the core layer was made in a tubular reactor and had a density of 0.922 g/cc increasing to 0.923 g/cc with the addition of silica and erucamide anti-block and slip agents, respectively, and melt index of 1.9 g/10 min. The $M_w/M_n$ of this polymer was 11 to 14.

The propylene/ethylene copolymer (E/P) used to make the two additional (outer) layers of the film contained about 3.5% ethylene based on the weight of the copolymer and had a melt flow index of 4 g/10 min. and contained 1500 ppm erucamide slip agent and 2500 ppm silica anti-block agent.

The E/P layer has an orientation temperature of about 125° C., while the core layer has a lower orientation, of about 110° C. The E/P layer also has a flex modulus of about 960 MPa as compared to 152 MPa for the blend of virgin polymers without recycle film present. With recycle film present as a blend with virgin polymer of the core layer, the flex modulus of the core layer was about 350 MPa.

The coextrusion procedure used in these Examples was as follows: A symmetrical three-layer film in the form of a tube 25.4 cm in diameter was extruded from concentric circular dies. The recycle scrap consisted of re-extruded flake to form pellets for easy blending with the virgin core polymer for the coextrusion process. The overall thickness of this film was about 13-20 mils (330-500 microns) as determined by the rate of coextrusion and the speed of a pair of nip rolls pulling the tube away from the face of the coextrusion die. The tube was quenched and then reheated by contact with hot air at a temperature of 145°-175° C. and then by exposure to infrared heaters operating at a heater surface temperature 300°-400° C. to provide an orientation temperature of about 125° C. for the entire film which is above the 110° C. orientation temperature of the core layer. Air was introduced into the tube and a bubble was blown. The bubble was collapsed at its downstream end and the edges of the "layflat" bubble were slit to form two webs of heat shrinkable film which were wound up on separate rolls. The air within the bubble was sealed at the downstream end by a second pair of nip rolls which also collapsed the bubble. The bubble was sealed at the upstream end by seals located between the quenching and the reheating facilities. Orientation of the 3-layer film was achieved by the transverse stretching of the film resulting from the blowing of the bubble at the orientation temperature of the film. In these Examples, the degree of transverse stretch was about 4.5X. Machine direction orientation was achieved by running the downstream nip rolls (sealing the bubble) at a surface speed of 4.3X faster than the upstream nip rolls. To eliminate residual low temperature shrinkage, the film of Examples 2 and 3 was annealed by heating it to 55° C. just prior to wind up.

Further details of these Examples and test results on the resultant heat shrinkable films make are shown in the following Table.

TABLE II

| Example | 1 | 2 | 3 | Comparison (Cryovac MDP-2055) |
|---|---|---|---|---|
| Wt. % of P/E layers based on weight of film | 35 | 35 | 28 | 50 |
| Wt. % of scrap recycle in core layer (based on wt. of film) | 29 | 27 | 35 | 0 |
| Wt. % P/E copolymer in entire film (outer layers & core layer) | 49 | 48 | 43 | 50 |
| Core layer composition (Wt %) | | | | |
| P/E copolymer | 22 | 20 | 21 | 0 |
| ULDPE | 58.5 | 60 | 59.2 | 0 |
| highly branched low density PE | 19.5 | 20 | 19.8 | 0 |
| LLDPE (d = 0.920 g/cc) | 0 | 0 | 0 | 100 |
| % Haze | 1.1 | 1.2 | 0.9 | 1.7 |
| % Gloss | 146 | 137 | 142 | 133 |

TABLE II-continued

| Example | 1 | 2 | 3 | Comparison (Cryovac MDP-2055) |
|---|---|---|---|---|
| % Transparency | 82 | 82 | 77 | 89 |
| Tensile strength, MPa | | | | |
| MD | 81.4 | 74.5 | N.T.* | 97.2 |
| TD | 65.5 | 62.7 | N.T. | 96.5 |
| Elongation, % | | | | |
| MD | 125 | 138 | N.T. | 129 |
| TD | 82 | 104 | N.T. | 129 |
| Tear Propagation, g/in. (ASTMD-1922-77) | | | | |
| MD | 21 | 22 | 26 | 23 |
| TD | 7.3 | 10 | 22 | 19 |
| Shrinkage, % at 110° C. | | | | |
| MD | 22 | 24 | 24 | 24 |
| TD | 30 | 32 | 34 | 35 |
| Shrink Force, kPa at 110° C. | | | | |
| MD | 1680 | N.T. | 1860 | 2890 |
| TD | 2150 | N.T. | 2000 | 3010 |

*N.T. = Not Tested

The overall thickness of the heat shrinkable film made in Examples 1-3 was 19 microns. The thickness of the Cryovac film was 19 microns. The results of the Examples show film having favorable heat shrinkage properties, especially for shrinkage force which is substantially less than the shrinkage force exhibited by the Cryovac film. By way of different comparison, a 19 micron monolayer film of P/E copolymer (same copolymer as used in the outer layers of the films of Examples 1-3) exhibited a shrinkage force of 2930 kPa and 3100 kPa in the machine and transverse directions, respectively, at 110° C. Despite the high proportion of this copolymer, especially in the film of Example 3, the overall film exhibits a much lower shrinkage force.

EXAMPLE 4

A five layer film was coextruded in the form of a tube, the film having (a) two outer layers of the E/P copolymer used in Example 1, (b) a core layer composed of the linear low density polyethylene and highly branched low density polyethylene used in Example 1 blended with recycled scrap multilayer film, and (c) two tie layers, each bonding an outer layer to the core layer, and each consisting entirely of recycle scrap multilayer film. The recycle used in the core layer and each tie layer is the same as was used in Example 3. The film was formed into heat shrinkable film essentially by the process of Examples 1-3. The resultant film had the following compositional characteristics: Wt. % of P/E layers based on weight of film=28%; Wt. % of recycle in core layer (based on wt. of film)=35%; and Wt. % of P/E in entire film (outer layers, tie layers, and core layer)=43%, whereby about 30% of the recycle was in the core layer and about 35% of the recycle was used to form each of the two tie layers. The composition of the core layer was 25% P/E, 57% linear low density polyethylene, and 19% highly branched low density polyethylene, all based on the weight of the core layers. The tie layers each had the following composition: 43% P/E, 42.8% linear low density polyethylene, and 14.2% highly branched low density polyethylene. The five-layer film of this Example exhibited shrinkage at 110° C. of 20% (MD) and 28% (TD) and shrink force (at 110° C.) of 1810 kPa (MD) and 2030 kPa (TD).

EXAMPLE 5

A five layer film was coextruded in tube form and oriented by essentially the same process as examples 1-3. The film had (a) two outer layers of P/E copolymer of 5% ethylene and melt index of 5; (b) a core layer of a 75:25 (w/w) blend of the low density linear polyethylene and highly branched low density polyethylene, respectively, used in Examples 1-3; (c) two tie layers, each bonding an outer layer to the core layer, each tie layer consisting entirely of scrap multilayer film. The scrap consisted of about 40% E/P copolymer as in (a), about 45% of the low density linear polyethylene as in (b), and the remainder of highly branched low density polyethylene as in (b). The layers were structured as follows: layers (a) each about 15 weight percent of total film thickness; layer (b) about 48 weight percent of the film; and layers (c) each about 11 weight percent of the film. This five layer oriented film was easy to make and it exhibited good shrinkage properties.

As many widely different embodiments of this invention may be made without departing from the spirit and scope thereof, it is to be understood that this invention is not limited to the specific embodiments thereof except as defined in the appended claims.

What is claimed is:

1. In the process of coextruding multilayer film having at least a core layer comprising thermoplastic polymer sandwiched between two outer layers comprised of thermoplastic polymer different from the thermoplastic polymer of said core and converting said film to heat shrinkable film, the improvement comprising proportioning the coextruded amount of each of the thermoplastic polymers so that said two outer layers each constitute about 10 to 20% of the weight of said film, selecting the composition of said different thermoplastic polymer so as to have greater stiffness than the stiffness of said thermoplastic polymer of said core, so as to provide greater stiffness to said heat shrinkable film, and coextruding recycle of said film into said core along with said thermoplastic polymer of said core, said recycle of said film constituting from about 10 to 45% based on the weight of said film of recycle of said film, the remainder of said core being said thermoplastic polymer of said core, and obtaining as a result thereof film which has excellent heat shrinkage properties.

2. In the process of claim 1 wherein the thermoplastic polymer of the outer layers also has a lower shrinkage and higher shrinkage force than the thermoplastic polymer of the core and nevertheless, the film has a higher heat shrinkability and lower shrinkage force than the thermoplastic polymer of said outer layers.

3. In the process of claim 1 wherein the thermoplastic polymer comprising each said outer layer is propylene-/ethylene copolymer.

4. In the process of claim 3 wherein said propylene-/ethylene copolymer contains from about 2 to 6% of ethylene based on the weight of the copolymer and has a melt index of about 1.5 to 10 g/10 min.

5. In the process of claim 3 wherein each said outer layer contains up to about 20% of polypropylene based on the weight of said additional layers.

6. In the process of claim 1 wherein said thermoplastic polymer comprising said core is a blend comprising (a) about 50 to 90% based on the weight of said polymer of linear polyethylene having a density of about 0.890 to 0.915 g/cc and being a copolymer of ethylene with about 10 to 16% of alpha-monoolefin having at least 4 carbon atoms based on the weight of said copolymer with (b) about 10 to 50% based on the weight of said polymer of highly branched polyethylene having a density of about 0.917 to 0.928 g/cc.

7. In the process of claim 6 wherein said linear polyethylene has a melt index of about 0.5 to 2.0.

8. In the process of claim 6 wherein said alpha-monoolefin is 1-octene.

9. In the process of claim 8 wherein said branched low density polyethylene has a density of about 0.917 to 0.925 g/cc and melt index of about 1.0 to 3.0 g/10 min. and $M_w/M_n$ greater than 10.

10. In the process of claim 1 wherein said recycle is derived from multilayer film comprising a core at least a portion of which comprising a blend comprising (i) about 50 to 90% based on the weight of said core of linear polyethylene having a density of about 0.890 to 0.915 g/cc, said linear polyethylene being a copolymer of ethylene with about 10 to 16% of alpha-monoolefin having at least 4 carbon atoms based on the weight of said copolymer and (ii) about 10 to 50% based on the weight of said core of highly branched polyethylene having a density of about 0.917 to 0.928 g/cc, said core being sandwiched between two outer layers comprising propylene/ethylene copolymer containing about 2 to 6% of ethylene based on the weight of said copolymer and containing as a blend therewith from 0 to about 20% of polypropylene, said core also containing about 10 to 45% of said recycle based on the weight of said core layer.

11. In the process of claim 1 wherein the proportion of recycle blended with thermoplastic polymer to form said core is about 25 to 40% based on the weight of said film.

12. In the process of claim 1 wherein said core is a single layer of blend of said thermoplastic polymer of said core with said recycle of said film.

13. In the process of claim 1 and additionally coextruding along with said outer layers said core comprising a plurality of layers comprising at least two tie layers and a core layer sandwiched between said tie layers.

14. In the process of claim 13 wherein each said tie layers are of said recycle of said film.

15. In the process of claim 14 wherein at least 10% of the recycle of said film in said core is in said core layer.

16. In the process of claim 14 wherein said core layer is free of recycle of said film.

17. Heat shrinkable film comprising coextruded layers forming said film, said coextruded layers comprising a core sandwiched between two outer layers, each said two outer layers constituting about 8 to 20% of the weight of said film, said core comprising virgin thermoplastic polymer and about 10 to 45% based on the weight of said film of recycle of said film, said recycle of said film being present as at least one separate layer in said core or as a blend with said virgin thermoplastic polymer as a layer in said core, or as a combination thereof, said virgin polymer being a blend comprising (i) about 50 to 90% based on the weight of said virgin polymer of linear polyethylene having a density of about 0.890 to 0.915 g/cc and being a copolymer of ethylene with about 10 to 16% alpha-monoolefin having at least 4 carbon atoms based on the weight of said copolymer with (ii) about 10 to 50% based on the weight of said virgin polymer of highly branched polyethylene having a density of about 0.917 to 0.928 g/cc, each said outer layers comprising propylene/ethylene copolymer containing from about 2 to 6% of ethylene based on the weight of said propylene/ethylene copolymer and blended therewith from 0 to about 20% of polypropylene based on the weight of said outer layers.

18. The heat shrinkable film of claim 17 exhibiting a shrinkage force of less than about 2100 kPa at 110° C.

19. The heat shrinkable film of claim 17 wherein said core comprises at least two separate layers and a core layer sandwiched between said separate layers for adhering the two outer layers to said core layer.

20. The heat shrinkable film of claim 19 wherein each said separate layer is of said recycle of said film in addition to the recycle of said film present in said core layer.

21. The heat shrinkable film of claim 19 wherein said core layer is free of recycle of said film.

22. The heat shrinkable film of claim 17 wherein said linear polyethylene has a density of 0.911 to 0.915 g/cc.

23. The heat shrinkable film of claim 17 wherein said linear polyethylene has a density of 0.91 to 0.914 g/cc.

24. The heat shrinkable film of claim 23 wherein said highly branched polyethylene has a $M_w/M_n$ greater than 10.

* * * * *